United States Patent
Golick et al.

(10) Patent No.: US 11,404,258 B2
(45) Date of Patent: Aug. 2, 2022

(54) METHOD TO REMOVE ION INTERFERENCES

(71) Applicant: Water Technologies Corporation, Milford, MA (US)

(72) Inventors: Daniel Golick, Newton, MA (US); Scott Geromanos, Middletown, NJ (US); Marc V Gorenstein, Needham, MA (US); Steven J Ciavarini, Natick, MA (US); Keith Fadgen, Hope Valley, RI (US)

(73) Assignee: Water Technologies Corporation, Milford, MA (US)

( * ) Notice: Subject to any disclaimer, the term of this patent is extended or adjusted under 35 U.S.C. 154(b) by 177 days.

(21) Appl. No.: 15/316,575

(22) PCT Filed: Jun. 5, 2015

(86) PCT No.: PCT/US2015/034448
§ 371 (c)(1),
(2) Date: Dec. 6, 2016

(87) PCT Pub. No.: WO2015/191390
PCT Pub. Date: Dec. 17, 2015

(65) Prior Publication Data
US 2017/0178883 A1    Jun. 22, 2017

Related U.S. Application Data

(60) Provisional application No. 62/009,573, filed on Jun. 9, 2014.

(30) Foreign Application Priority Data

Jun. 17, 2014   (EP) ..................................... 14172839

(51) Int. Cl.
*H01J 49/00* (2006.01)
*G01N 30/72* (2006.01)

(52) U.S. Cl.
CPC ...... *H01J 49/0036* (2013.01); *G01N 30/7233* (2013.01)

(58) Field of Classification Search
CPC ......................... H01J 49/0036; G01N 30/7233
See application file for complete search history.

(56) References Cited

U.S. PATENT DOCUMENTS 6,717,130 B2 *  4/2004  Bateman ............. H01J 49/0045
                                                          250/281
8,480,110 B2    9/2013  Gorenstein et al.
(Continued)

FOREIGN PATENT DOCUMENTS

GB    WO 2013005060 A2 *  1/2013 .......... H01J 49/0059

*Primary Examiner* — Sean M Luck
(74) *Attorney, Agent, or Firm* — Goodwin Procter LLP (57) ABSTRACT

A method of mass spectrometry is disclosed comprising mass analysing an eluent from a chromatography device and obtaining parent ion data sets and corresponding product ion data sets, and determining whether, in a first product ion data set, one or more product ions are present that are related to one or more parent ions in a corresponding first parent ion data set, based on the mass or mass to charge ratio and/or intensity of the one or more product ions and the one or more parent ions. If it is determined that the one or more product ions are present, the method further comprises removing the one or more product ions from one or more second product ion data sets to produce one or more second modified product ion data sets and/or removing ions other than the one or more product ions from the first product ion data set to produce a first modified product ion data set.

18 Claims, 1 Drawing Sheet

(56) References Cited

U.S. PATENT DOCUMENTS

| | | | |
|---|---|---|---|
| 8,592,752 B2 | 11/2013 | Gorenstein et al. | |
| 9,063,162 B2 | 6/2015 | Geromanos et al. | |
| 9,312,110 B2 | 4/2016 | Geromanos et al. | |
| 2006/0138320 A1* | 6/2006 | Bateman | H01J 49/0031 250/288 |
| 2009/0273782 A1* | 11/2009 | Yoo | B23K 26/03 356/318 |
| 2011/0226941 A1* | 9/2011 | Gorenstein | G01N 30/7233 250/282 |
| 2012/0278037 A1* | 11/2012 | Matsuura | G06F 15/00 702/173 |
| 2013/0238253 A1 | 9/2013 | Oliphant et al. | |

* cited by examiner

METHOD TO REMOVE ION INTERFERENCES

CROSS-REFERENCE TO RELATED APPLICATIONS

This application represents the U.S. National Phase of International Application number PCT/US2015/034448 entitled "Method to Remove Ion Interferences" filed 5 Jun. 2015, which claims priority from and the benefit of United States provisional patent application No. 62/009,573 filed on 9 Jun. 2014 and European patent application No. 14172839.4 filed on 17 Jun. 2014. The entire contents of these applications are incorporated herein by reference.

FIELD OF THE INVENTION

The present invention relates generally to mass spectrometry and in particular to mass spectrometers and methods of mass spectrometry.

BACKGROUND

Liquid chromatography ("LC") is a method by which various species from a complex mixture can be separated out into their individual components. Individual species or components of the mixture elute from the liquid chromatography system at substantially different times. Liquid chromatography systems are commonly used in conjunction with a mass spectrometer ("MS") or a tandem mass spectrometer ("MS/MS").

Known liquid chromatography-MS and liquid chromatography-MS/MS acquisition techniques typically involve acquiring one or more parent (precursor) ion data sets (spectra) and one or more corresponding product ion data sets (spectra) for a sample eluting from an liquid chromatography device. In these techniques, eluent from an liquid chromatography column is passed into an ion source, where it is ionised. A fragmentation, collision or reaction device is arranged downstream of the ion source to selectively fragment or react parent ions to produce product ions. Typically, a Time of Flight ("ToF") mass spectrometer is arranged downstream of the fragmentation, collision or reaction device, and is used to acquire the parent and product ion data sets.

In one known such arrangement, a collision cell is switched between a high-energy state in which parent ions are fragmented (and product ions are thereby produced), and a low-energy state, in which parent ions are not fragmented (or are fragmented to a lesser degree). In such "alternate scanning" arrangements, the acquired data sets (spectra) alternate between parent ion data sets and product ion data sets. The collision cell may be switched between the high energy state and the low energy state on a time scale similar to that of a chromatographic elution peak, so that each chromatographic peak is sampled in both the high and low energy states, and one or more parent ion data sets and one or more corresponding product ion data sets are acquired for each chromatographic peak.

After acquiring the data sets, product and parent ions are detected in the data sets, and product ions are assigned or "binned" to parent ions. Binning may be accomplished, for example, by chromatographic retention time alignment. A product ion may be assigned (binned) to one or more particular parent ions if the product ion's retention time is the same as that of the one or more parent ions, within measurement error. Measurement error is typically taken to be a fraction of the peak width of the one or more parent ions. For example, a product ion may be assigned to one or more particular parent ions if the product ion's retention time is within±the half-width at half maximum ("HWHM") of the chromatographic peak width of the one or more parent ions.

In alternate scanning methods, product ions related to (derived from) all of the parents ions present in the source will be present in the product ion data set (spectrum). If two components co-elute so that their chromatographic peaks can be distinguished by retention time alignment, the product ions can properly be assigned to the correct parent ions. However, in complex samples it is common that two components will co-elute such that their retention times are close enough so as to be indistinguishable. As a result, product ions may be erroneously assigned to (binned to) more than one particular parent ion (or particular set of parent ions).

Another known acquisition technique additionally makes use of ion mobility. In such arrangements, an ion mobility separation ("IMS") device is arranged downstream of the ion source and upstream of the fragmentation, collision or reaction device. Binning is accomplished by retention time alignment as well as ion mobility alignment. Thus, different components of the sample can more readily be distinguished, and product ions can be more accurately assigned to the appropriate parent ions. However, there are still a significant number of cases where components have retention times and drift times that cannot be distinguished.

Another known acquisition technique is known as "SWATH" acquisition. In this arrangement, a transmission window of, for example, 25 Da is sequentially incremented in steps of approximately 25 Da. Product ions related to (derived from) all of the parents ions present in the transmission window are present in each product ion data set.

Another known acquisition technique is Data Dependent Analysis ("DDA") acquisition. In this technique, parent ion data sets (spectra) are acquired and monitored over a relatively large mass to charge ratio (m/z) range. When a parent ion of interest is detected (e.g. that meets a trigger criterion), the transmission window of the first quadrupole of the tandem mass spectrometer is adjusted so as to pass only parent ions within a relatively small mass to charge ratio window (e.g. 4 Da) centered on the parent ion of interest. Simultaneously, a voltage is raised in the collision cell so as to fragment parent ions to produce product ions, and one or more product ion data sets (spectra) are acquired.

The product ion data sets (spectra) will contain ions relating to all the parent ions present within the (4 Da) transmission window. Thus, co-eluting components that have parent ion mass to charge ratio values within the (4 Da) transmission window will produce product ions that appear in the same product ion data set (spectrum). Thus, a product ion data set nominally triggered by (and attributed to) one or more particular parent ions, can contain product ions relating to (derived from) another parent ion.

Thus, no matter which acquisition technique is used, product ion data sets (spectra) assigned to one or more particular parent ions will often contain (i.e. will be contaminated by) additional ions, unrelated to (i.e. not derived from) the one or more particular parent ions. These ions may be related to (derived from) other parent ions that co-eluted with the one or more particular parent ions, as discussed above, or may come from other sources of chemical background.

In the known methods, these contaminated data sets (spectra) are submitted to search engines in order to identify the parent ions. For example, in the case of bottom-up proteomic applications, the mass to charge ratios of the ions present in the data sets are submitted to search engines to identify peptides in the sample mixture and to thereby infer the particular proteins from which the peptides were derived.

However, the unrelated interloper product ions can cause false positive identifications and/or can reduce the accuracy of identifications e.g. by being used as evidence to reduce the significance of the putative identification.

US 2013/0238253 (Oliphant) discloses a method in which ion peaks in chromatography-MS data are grouped by comparing retention time and peak heights, and then identified by comparing with user specified target ions.

US 2013/0116933 (Geromanos) discloses a method in which mass to charge ratio-retention time "data pairs" are generated from LC-MS data and then matched to known ions based on the mass to charge ratio-retention time values.

WO 2009/146345 (Waters) discloses a method of matching precursor ions with related product ions.

It is desired to provide an improved mass spectrometer and method of mass spectrometry.

SUMMARY

According to an aspect there is provided a method of mass spectrometry comprising:

mass analysing an eluent from a chromatography device and obtaining a plurality of parent ion data sets and a plurality of corresponding product ion data sets; and determining whether, in a first product ion data set of the plurality of product ion data sets, one or more product ions are present that are related to one or more parent ions in a corresponding first parent ion data set of the plurality of parent ion data sets, based on the masses or mass to charge ratios and/or intensities of the one or more product ions and the one or more parent ions;

wherein if it is determined that the one or more product ions are present, the method further comprises removing the one or more product ions from one or more second product ion data sets of the plurality of product ion data sets to produce one or more second modified product ion data sets.

In an embodiment, if it is determined that the one or more product ions are present, the method further comprises removing ions other than the one or more product ions from the first product ion data set to produce a first modified product ion data set.

According to another aspect there is provided a method of mass spectrometry comprising:

mass analysing an eluent from a chromatography device and obtaining one or more parent ion data sets and one or more corresponding product ion data sets;

determining whether, in a first product ion data set of the one or more product ions data sets, one or more product ions are present that are related to one or more parent ions in a corresponding first parent ion data set of the one or more parent ion data sets, based on the masses or mass to charge ratios and/or intensities of the one or more product ions and the one or more parent ions;

wherein if it is determined that the one or more product ions are present, the method further comprises removing ions other than the one or more product ions from the first product ion data set to produce a first modified product ion data set.

According to various embodiments, it is determined whether one or more product ions are present in a first product ion data set that are related to one or more parent ions in a corresponding first parent ion data set, based on the masses or mass to charge ratios and/or intensities of the one or more product ions and the one or more parent ions. The one or more product ions that are determined to be related to the one or more parent ions are then removed from one or more other product ion data sets and/or ions other than the one or more product ions are removed from the first product ion data set.

In various embodiments, these methods are applied to product ion data sets after their acquisition, but prior to submitting them to a search engine. Advantageously, product ions that should not be associated with a given parent ion are removed from product ion data sets associated with that parent ion. By removing product ions unrelated to a parent ion, the number of false positives can be reduced and the quality and number of correct identifications can be increased.

The determination as to whether a product ion is related to a parent ion in a corresponding parent ion data set is based on the masses or mass to charge ratios and/or intensities of both the product ion(s) and the parent ion(s), and may comprise comparing the masses or mass to charge ratios and/or intensities of the product ion(s) and the parent ion(s). This is in contrast with US 2013/0238253 (Oliphant) in which ion peaks are identified by comparing with user specified target ions, US 2013/0116933 (Geromanos) in which mass to charge ratio-retention time "data pairs" are matched to known ions based on mass to charge ratio-retention time values, and WO 2009/146345 (Waters) in which precursor ions are matched to product ions based on the retention times of the precursor ions and the product ions and on the intensity of the precursor ions.

Various embodiments make use of generic properties of the parent ions related to the sample type being analysed, and do not rely on the identity of the given parent ion (which has not yet been determined using a search engine).

Furthermore, the methods can be applied to product ion data sets (spectra) obtained from a wide range of liquid chromatography-MS and liquid chromatography-MS/MS acquisition techniques.

It will therefore be apparent that various embodiments provide an improved mass spectrometer and method of mass spectrometry.

The chromatography device may comprise a liquid chromatography column.

The eluent may comprise an analyte mixed with an aqueous solvent or solution and an organic solvent.

Mass analysing the eluent may comprise ionising the eluent to produce a plurality of ions.

Mass analysing the eluent may comprise mass analysing the plurality of ions to obtain the one or more parent ion data sets.

The method may further comprise fragmenting or reacting the plurality of ions in a fragmentation, collision or reaction device to produce a plurality of product ions.

Mass analysing the eluent may comprise mass analysing the plurality of product ions to obtain the one or more product ion data sets.

The method may further comprise mass analysing ions using a Time of Flight mass analyser, a Fourier Transform Ion Cyclotron Resonance mass analyser or an electrostatic orbital mass analyser.

The method may further comprise separating the plurality of ions according to their ion mobility.

The method may further comprise obtaining the plurality of parent ion data sets and the plurality of corresponding product ion data sets using ion mobility drift alignment.

The method may further comprise obtaining the plurality of parent ion data sets and the plurality of corresponding product ion data sets using retention time alignment.

The method may further comprise obtaining the plurality of parent ion data sets and the plurality of corresponding product ion data sets using a Data Dependent Acquisition mode of operation.

The one or more second product ion data sets may comprise product ion data sets acquired at the same time, immediately before or immediately after the first product ion data set; and/or the one or more second parent ion data sets may comprise parent ion data sets acquired at the same time, immediately before or immediately after the first parent ion data set.

In an embodiment, determining whether, in the first product ion data set, one or more product ions are present that are related to one or more parent ions in the corresponding first parent ion data set comprises examining or comparing the masses or mass to charge ratios and/or intensities of ions in the first parent ion data set and/or of ions in the first product ion data set.

In an embodiment, determining whether, in the first product ion data set, one or more product ions are present that are related to one or more parent ions in the corresponding first parent ion data set comprises determining whether, in the first product ion data set, one or more ions are present that must be related to or that are likely to be related to the one or more parent ions in the corresponding first parent ion data set.

In an embodiment, determining whether, in the first product ion data set, one or more product ions are present that are related to one or more parent ions in the corresponding first parent ion data set comprises determining whether one or more anchor ions are present in the corresponding first product ion data set.

In an embodiment, determining whether, in the first product ion data set, one or more product ions are present that are related to one or more parent ions in the corresponding first parent ion data set comprises determining whether: (i) one or more unfragmented parent ions; (ii) one or more neutral loss ions; (iii) one or more complementary product ion pairs; (iv) one or more extended complementary product ion pairs; (v) one or more charge replicates; and/or (vi) one or more in-source replicate ions; are present in the first product ion data set.

The method may further comprise determining whether, in the first product ion data set, one or more additional product ions are present that are related to the one or more parent ions in the corresponding first parent ion data set by identifying ions in the first product ion data set that have a mass or mass to charge ratio value differing from the mass or mass to charge ratio value of the one or more product ions by an amount substantially equal to the mass or mass to charge ratio of one or more known fragmentation subunits.

The method may further comprise identifying one or more virtual anchor ions for the first product ion data set.

The method may further comprise removing the identified one or more virtual anchor ions from the one or more second product ion data sets to produce the one or more second modified product ion data sets.

The method may further comprise determining whether, in the first product ion data set, one or more additional product ions are present that are related to the one or more parent ions in the corresponding first parent ion data set by identifying ions in the first product ion data set that have a mass or mass to charge ratio value differing from the mass or mass to charge ratio value of the identified one or more virtual anchor ions by an amount substantially equal to the mass or mass to charge ratio of one or more known fragmentation subunits.

The method may further comprise determining whether, in the first product ion data set, one or more additional product ions are present that are related to the one or more parent ions in the corresponding first parent ion data set by identifying ions in the first product ion data set that have a mass or mass to charge ratio value differing from the mass or mass to charge ratio value of the one or more additional product ions by an amount substantially equal to the mass or mass to charge ratio of one or more known fragmentation subunits.

The method may further comprise removing the one or more additional product ions from the one or more second product ion data sets to produce the one or more second modified product ion data sets.

The method may further comprise removing ions other than the one or more product ions and the one or more additional product ions from the first product ion data set to produce the first modified product ion data set.

The method may further comprise removing, from the first product ion data set, ions that cannot be related to the one or more parent ions in the corresponding first parent ion data set to produce the first modified product ion data set.

The method may further comprise:

removing the one or more parent ions from the first parent ion data set and/or from one or more second parent ion data sets; or removing ions other than the one or more parent ions from the first parent ion data set and/or from one or more second parent ion data sets The first parent ion data set may be attributed to one or more first parent ions; and the one or more second parent ion data sets may be attributed to one or more second, different parent ions.

The method may further comprise:

determining whether, in the first product ion data set, one or more ions are present that have an intensity greater than or less than a portion of the intensity of the one or more parent ions in the corresponding first parent ion data set; and if it is determined that the one or more ions are present, removing the one or more ions from the first product ion data set to produce the first modified product ion data set.

The method may further comprise:

submitting the one or more parent ion data sets and the one or more corresponding modified product ion data sets to a search engine to determine the composition of the eluent.

The method may further comprise:

determining whether one or more complementary product ion pairs are present in the first product ion data set; and if it is determined that one or more complementary product ion pairs are present in the first product ion data set, submitting the first product ion data set and the corresponding first parent ion data set to a search engine to determine the composition of the eluent.

The method may further comprise:

if it is determined that the one or more product ions are not present in the first product ion data set, submitting the first product ion data set and the corresponding first parent ion data set to a search engine to determine the composition of the eluent.

According to another aspect there is provided a mass spectrometer comprising:

a chromatography device and a mass analyser; and a control system arranged and adapted:

(i) to cause the mass spectrometer to mass analyse an eluent from the chromatography device and to obtain a plurality of parent ion data sets and a plurality of corresponding product ion data sets; and (ii) to determine whether, in a first product ion data set of the plurality of product ion data sets, one or more product ions are present that are related to one or more parent ions in a corresponding first parent ion data set of said plurality of parent ion data sets, based on the masses or mass to charge ratios and/or intensities of the one or more product ions and the one or more parent ions;

wherein if it is determined that the one or more product ions are present, the control system is further arranged and adapted to remove the one or more product ions from one or more second product ion data sets of said plurality of product ion data sets to produce one or more second modified product ion data sets.

According to another aspect there is provided a mass spectrometer comprising:

a chromatography device and a mass analyser; and a control system arranged and adapted:

(i) to cause the mass spectrometer to mass analyse an eluent from the chromatography device and obtain one or more parent ion data sets and one or more corresponding product ion data sets; and (ii) to determine whether, in a first product ion data set of said one or more product ion data sets, one or more product ions are present that are related to one or more parent ions in a corresponding first parent ion data set of said one or more parent ion data sets, based on the masses or mass to charge ratios and/or intensities of the one or more product ions and the one or more parent ions;

wherein if it is determined that the one or more product ions are present, the control system is further arranged and adapted to remove ions other than the one or more product ions from the first product ion data set to produce a first modified product ion data set.

According to another aspect there is provided a method of mass spectrometry comprising:

obtaining one or more parent ion data sets and one or more corresponding product ion data sets;

identifying one or more anchor ions in a first product ion data set; and removing the one or more anchor ions from one or more second product ion data sets and/or removing ions other than the one or more anchor ions from the first product ion data set.

According to another aspect there is provided a mass spectrometer comprising:

a device arranged and adapted to obtain one or more parent ion data sets and one or more corresponding product ion data sets;

a device arranged and adapted to identify one or more anchor ions in a first product ion data set; and a device arranged and adapted to remove the one or more anchor ions from one or more second product ion data sets and/or remove ions other than the one or more anchor ions from the first product ion data set.

According to another aspect there is provided a method of mass spectrometry comprising:

mass analysing an eluent from a chromatography device and obtaining a plurality of parent ion data sets and a plurality of corresponding product ion data sets; and determining whether, in a first product ion data set, one or more product ions are present that are related to one or more parent ions in a corresponding first parent ion data set by determining whether: (i) one or more unfragmented parent ions; (ii) one or more neutral loss ions; (iii) one or more complementary product ion pairs; (iv) one or more extended complementary product ion pairs; (v) one or more charge replicates; and/or (vi) one or more in-source replicate ions are present in the first product ion data set;

wherein if it is determined that the one or more product ions are present, the method further comprises removing the one or more product ions from one or more second product ion data sets to produce one or more second modified product ion data sets.

According to another aspect there is provided a method of mass spectrometry comprising:

mass analysing an eluent from a chromatography device and obtaining one or more parent ion data sets and one or more corresponding product ion data sets; and determining whether, in a first product ion data set, one or more product ions are present that are related to one or more parent ions in a corresponding first parent ion data set by determining whether: (i) one or more unfragmented parent ions; (ii) one or more neutral loss ions; (iii) one or more complementary product ion pairs; (iv) one or more extended complementary product ion pairs; (v) one or more charge replicates; and/or (vi) one or more in-source replicate ions are present in the first product ion data set;

wherein if it is determined that the one or more product ions are present, the method further comprises removing ions other than the one or more product ions from the first product ion data set to produce a first modified product ion data set.

According to another aspect there is provided a mass spectrometer comprising:

a chromatography device and a mass analyser; and a control system arranged and adapted:

(i) to cause the mass spectrometer to mass analyse an eluent from the chromatography device and to obtain a plurality of parent ion data sets and a plurality of corresponding product ion data sets; and (ii) to determine whether, in a first product ion data set, one or more product ions are present that are related to one or more parent ions in a corresponding first parent ion data set by determining whether: (i) one or more unfragmented parent ions; (ii) one or more neutral loss ions; (iii) one or more complementary product ion pairs; (iv) one or more extended complementary product ion pairs; (v) one or more charge replicates; and/or (vi) one or more in-source replicate ions are present in the first product ion data set;

wherein if it is determined that the one or more product ions are present, the control system is further arranged and adapted to remove the one or more product ions from one or more second product ion data sets to produce one or more second modified product ion data sets.

According to another aspect there is provided a mass spectrometer comprising:

a chromatography device and a mass analyser; and a control system arranged and adapted:

(i) to cause the mass spectrometer to mass analyse an eluent from the chromatography device and obtain one or more parent ion data sets and one or more corresponding product ion data sets; and (ii) to determine whether, in a first product ion data set, one or more product ions are present that are related to one or more parent ions in a corresponding first parent ion data set by determining whether: (i) one or more unfragmented parent ions; (ii) one or more neutral loss ions; (iii) one or more complementary product ion pairs; (iv) one or more extended complementary product ion pairs; (v) one or more charge replicates; and/or (vi) one or more in-source replicate ions are present in the first product ion data set;

wherein if it is determined that the one or more product ions are present, the control system is further arranged and adapted to remove ions other than the one or more product ions from the first product ion data set to produce a first modified product ion data set.

According to an aspect there is provided a method of mass spectrometry comprising:

mass analysing an eluent from a chromatography device and obtaining a plurality of parent ion data sets and a plurality of corresponding product ion data sets;

determining whether, in a first product ion data set, one or more product ions are present that are related to one or more parent ions in a corresponding first parent ion data set wherein if it is determined that the one or more product ions are present, the method further comprises removing the one or more product ions from one or more second product ion data sets to produce one or more second modified product ion data sets.

In an embodiment, if it is determined that the one or more product ions are present, the method further comprises removing ions other than the one or more product ions from the first product ion data set to produce a first modified product ion data set.

According to another aspect there is provided a method of mass spectrometry comprising:

mass analysing an eluent from a chromatography device and obtaining one or more parent ion data sets and one or more corresponding product ion data sets;

determining whether, in a first product ion data set, one or more product ions are present that are related to one or more parent ions in a corresponding first parent ion data set wherein if it is determined that the one or more product ions are present, the method further comprises removing ions other than the one or more product ions from the first product ion data set to produce a first modified product ion data set.

According to another aspect there is provided a mass spectrometer comprising:

a chromatography device and a mass analyser; and a control system arranged and adapted:

(i) to cause the mass spectrometer to mass analyse an eluent from the chromatography device and to obtain a plurality of parent ion data sets and a plurality of corresponding product ion data sets; and (ii) to determine whether, in a first product ion data set, one or more product ions are present that are related to one or more parent ions in a corresponding first parent ion data set wherein if it is determined that the one or more product ions are present, the control system is further arranged and adapted to remove the one or more product ions from one or more second product ion data sets to produce one or more second modified product ion data sets.

According to another aspect there is provided a mass spectrometer comprising:

a chromatography device and a mass analyser; and a control system arranged and adapted:

(i) to cause the mass spectrometer to mass analyse an eluent from the chromatography device and obtain one or more parent ion data sets and one or more corresponding product ion data sets; and (ii) to determine whether, in a first product ion data set, one or more product ions are present that are related to one or more parent ions in a corresponding first parent ion data set wherein if it is determined that the one or more product ions are present, the control system is further arranged and adapted to remove ions other than the one or more product ions from the first product ion data set to produce a first modified product ion data set.

According to an embodiment the mass spectrometer may further comprise:

(a) an ion source selected from the group consisting of: (i) an Electrospray ionisation ("ESI") ion source; (ii) an Atmospheric Pressure Photo Ionisation ("APPI") ion source; (iii) an Atmospheric Pressure Chemical Ionisation ("APCI") ion source; (iv) a Matrix Assisted Laser Desorption Ionisation ("MALDI") ion source; (v) a Laser Desorption Ionisation ("LDI") ion source; (vi) an Atmospheric Pressure Ionisation ("API") ion source; (vii) a Desorption Ionisation on Silicon ("DIOS") ion source; (viii) an Electron Impact ("EI") ion source; (ix) a Chemical Ionisation ("CI") ion source; (x) a Field Ionisation ("FI") ion source; (xi) a Field Desorption ("FD") ion source; (xii) an Inductively Coupled Plasma ("ICP") ion source; (xiii) a Fast Atom Bombardment ("FAB") ion source; (xiv) a Liquid Secondary Ion Mass Spectrometry ("LSIMS") ion source; (xv) a Desorption Electrospray Ionisation ("DESI") ion source; (xvi) a Nickel-63 radioactive ion source; (xvii) an Atmospheric Pressure Matrix Assisted Laser Desorption Ionisation ion source; (xviii) a Thermospray ion source; (xix) an Atmospheric Sampling Glow Discharge Ionisation ("ASGDI") ion source; (xx) a Glow Discharge ("GD") ion source; (xxi) an Impactor ion source; (xxii) a Direct Analysis in Real Time ("DART") ion source; (xxiii) a Laserspray Ionisation ("LSI") ion source; (xxiv) a Sonicspray Ionisation ("SSI") ion source; (xxv) a Matrix Assisted Inlet Ionisation ("MAII") ion source; (xxvi) a Solvent Assisted Inlet Ionisation ("SAII") ion source; (xxvii) a Desorption Electrospray Ionisation ("DESI") ion source; and (xxviii) a Laser Ablation Electrospray Ionisation ("LAESI") ion source; and/or (b) one or more continuous or pulsed ion sources; and/or (c) one or more ion guides; and/or (d) one or more ion mobility separation devices and/or one or more Field Asymmetric Ion Mobility Spectrometer devices; and/or (e) one or more ion traps or one or more ion trapping regions; and/or (f) one or more collision, fragmentation or reaction cells selected from the group consisting of: (i) a Collisional Induced Dissociation ("CID") fragmentation device; (ii) a Surface Induced Dissociation ("SID") fragmentation device; (iii) an Electron Transfer Dissociation ("ETD") fragmentation device; (iv) an Electron Capture Dissociation ("ECD") fragmentation device; (v) an Electron Collision or Impact Dissociation fragmentation device; (vi) a Photo Induced Dissociation ("PID") fragmentation device; (vii) a Laser Induced Dissociation fragmentation device; (viii) an infrared radiation induced dissociation device; (ix) an ultraviolet radiation induced dissociation device; (x) a nozzle-skimmer interface fragmentation device; (xi) an in-source fragmentation device; (xii) an in-source Collision Induced Dissociation fragmentation device; (xiii) a thermal or temperature source fragmentation device; (xiv) an electric field induced fragmentation device; (xv) a magnetic field induced fragmentation device; (xvi) an enzyme digestion or enzyme degradation fragmentation device; (xvii) an ion-ion reaction fragmentation device; (xviii) an ion-molecule reaction fragmentation device; (xix) an ion-atom reaction fragmentation device; (xx) an ion-metastable ion reaction fragmentation device; (xxi) an ion-metastable molecule reaction fragmentation device; (xxii) an ion-metastable atom reaction fragmentation device; (xxiii) an ion-ion reaction device for reacting ions to form adduct or product ions; (xxiv) an ion-molecule reaction device for reacting ions to form adduct or product ions; (xxv) an ion-atom reaction device for reacting ions to form adduct or product ions; (xxvi) an ion-metastable ion reaction device for reacting ions to form adduct or product ions; (xxvii) an ion-metastable molecule reaction device for reacting ions to form adduct or product ions; (xxviii) an ion-metastable atom reaction device for reacting ions to form adduct or product ions; and (xxix) an Electron Ionisation Dissociation ("EID") fragmentation device; and/or (g) a mass analyser selected from the group consisting of: (i) a quadrupole mass analyser; (ii) a 2D or linear quadrupole mass analyser; (iii) a Paul or 3D quadrupole mass analyser; (iv) a Penning trap mass analyser; (v) an ion trap mass analyser; (vi) a magnetic sector mass analyser; (vii) Ion Cyclotron Resonance ("ICR") mass analyser; (viii) a Fourier Transform Ion Cyclotron Resonance ("FTICR") mass analyser; (ix) an electrostatic mass analyser arranged to generate an electrostatic field having a quadro-logarithmic potential distribution; (x) a Fourier Transform electrostatic mass analyser; (xi) a Fourier Transform mass analyser; (xii) a Time of Flight mass analyser; (xiii) an orthogonal acceleration Time of Flight mass analyser; and (xiv) a linear acceleration Time of Flight mass analyser; and/or (h) one or more energy analysers or electrostatic energy analysers; and/or (i) one or more ion detectors; and/or (j) one or more mass filters selected from the group consisting of: (i) a quadrupole mass filter; (ii) a 2D or linear quadrupole ion trap; (iii) a Paul or 3D quadrupole ion trap; (iv) a Penning ion trap; (v) an ion trap; (vi) a magnetic sector mass filter; (vii) a Time of Flight mass filter; and (viii) a Wien filter; and/or (k) a device or ion gate for pulsing ions; and/or (l) a device for converting a substantially continuous ion beam into a pulsed ion beam.

The mass spectrometer may further comprise either:

(i) a C-trap and a mass analyser comprising an outer barrel-like electrode and a coaxial inner spindle-like electrode that form an electrostatic field with a quadro-logarithmic potential distribution, wherein in a first mode of operation ions are transmitted to the C-trap and are then injected into the mass analyser and wherein in a second mode of operation ions are transmitted to the C-trap and then to a collision cell or Electron Transfer Dissociation device wherein at least some ions are fragmented into fragment ions, and wherein the fragment ions are then transmitted to the C-trap before being injected into the mass analyser; and/or (ii) a stacked ring ion guide comprising a plurality of electrodes each having an aperture through which ions are transmitted in use and wherein the spacing of the electrodes increases along the length of the ion path, and wherein the apertures in the electrodes in an upstream section of the ion guide have a first diameter and wherein the apertures in the electrodes in a downstream section of the ion guide have a second diameter which is smaller than the first diameter, and wherein opposite phases of an AC or RF voltage are applied, in use, to successive electrodes.

According to an embodiment the mass spectrometer further comprises a device arranged and adapted to supply an AC or RF voltage to the electrodes. The AC or RF voltage optionally has an amplitude selected from the group consisting of: (i) about <50 V peak to peak; (ii) about 50-100 V peak to peak; (iii) about 100-150 V peak to peak; (iv) about 150-200 V peak to peak; (v) about 200-250 V peak to peak; (vi) about 250-300 V peak to peak; (vii) about 300-350 V peak to peak; (viii) about 350-400 V peak to peak; (ix) about 400-450 V peak to peak; (x) about 450-500 V peak to peak; and (xi) > about 500 V peak to peak.

The AC or RF voltage may have a frequency selected from the group consisting of: (i) <about 100 kHz; (ii) about 100-200 kHz; (iii) about 200-300 kHz; (iv) about 300-400 kHz; (v) about 400-500 kHz; (vi) about 0.5-1.0 MHz; (vii) about 1.0-1.5 MHz; (viii) about 1.5-2.0 MHz; (ix) about 2.0-2.5 MHz; (x) about 2.5-3.0 MHz; (xi) about 3.0-3.5 MHz; (xii) about 3.5-4.0 MHz; (xiii) about 4.0-4.5 MHz; (xiv) about 4.5-5.0 MHz; (xv) about 5.0-5.5 MHz; (xvi) about 5.5-6.0 MHz; (xvii) about 6.0-6.5 MHz; (xviii) about 6.5-7.0 MHz; (xix) about 7.0-7.5 MHz; (xx) about 7.5-8.0 MHz; (xxi) about 8.0-8.5 MHz; (xxii) about 8.5-9.0 MHz; (xxiii) about 9.0-9.5 MHz; (xxiv) about 9.5-10.0 MHz; and (xxv) >about 10.0 MHz.

The mass spectrometer may also comprise a chromatography or other separation device upstream of an ion source. According to an embodiment the chromatography separation device comprises a liquid chromatography or gas chromatography device. According to another embodiment the separation device may comprise: (i) a Capillary Electrophoresis ("CE") separation device; (ii) a Capillary Electrochromatography ("CEC") separation device; (iii) a substantially rigid ceramic-based multilayer microfluidic substrate ("ceramic tile") separation device; or (iv) a supercritical fluid chromatography separation device.

The ion guide may be maintained at a pressure selected from the group consisting of: (i) <about 0.0001 mbar; (ii) about 0.0001-0.001 mbar; (iii) about 0.001-0.01 mbar; (iv) about 0.01-0.1 mbar; (v) about 0.1-1 mbar; (vi) about 1-10 mbar; (vii) about 10-100 mbar; (viii) about 100-1000 mbar; and (ix) > about 1000 mbar.

According to an embodiment analyte ions may be subjected to Electron Transfer Dissociation ("ETD") fragmentation in an Electron Transfer Dissociation fragmentation device. Analyte ions may be caused to interact with ETD reagent ions within an ion guide or fragmentation device.

According to an embodiment in order to effect Electron Transfer Dissociation either: (a) analyte ions are fragmented or are induced to dissociate and form product or fragment ions upon interacting with reagent ions; and/or (b) electrons are transferred from one or more reagent anions or negatively charged ions to one or more multiply charged analyte cations or positively charged ions whereupon at least some of the multiply charged analyte cations or positively charged ions are induced to dissociate and form product or fragment ions; and/or (c) analyte ions are fragmented or are induced to dissociate and form product or fragment ions upon interacting with neutral reagent gas molecules or atoms or a non-ionic reagent gas; and/or (d) electrons are transferred from one or more neutral, non-ionic or uncharged basic gases or vapours to one or more multiply charged analyte cations or positively charged ions whereupon at least some of the multiply charged analyte cations or positively charged ions are induced to dissociate and form product or fragment ions; and/or (e) electrons are transferred from one or more neutral, non-ionic or uncharged superbase reagent gases or vapours to one or more multiply charged analyte cations or positively charged ions whereupon at least some of the multiply charge analyte cations or positively charged ions are induced to dissociate and form product or fragment ions; and/or (f) electrons are transferred from one or more neutral, non-ionic or uncharged alkali metal gases or vapours to one or more multiply charged analyte cations or positively charged ions whereupon at least some of the multiply charged analyte cations or positively charged ions are induced to dissociate and form product or fragment ions; and/or (g) electrons are transferred from one or more neutral, non-ionic or uncharged gases, vapours or atoms to one or more multiply charged analyte cations or positively charged ions whereupon at least some of the multiply charged analyte cations or positively charged ions are induced to dissociate and form product or fragment ions, wherein the one or more neutral, non-ionic or uncharged gases, vapours or atoms are selected from the group consisting of: (i) sodium vapour or atoms; (ii) lithium vapour or atoms; (iii) potassium vapour or atoms; (iv) rubidium vapour or atoms; (v) cesium vapour or atoms; (vi) francium vapour or atoms; (vii) C60 vapour or atoms; and (viii) magnesium vapour or atoms.

The multiply charged analyte cations or positively charged ions may comprise peptides, polypeptides, proteins or biomolecules.

According to an embodiment in order to effect Electron Transfer Dissociation: (a) the reagent anions or negatively charged ions are derived from a polyaromatic hydrocarbon or a substituted polyaromatic hydrocarbon; and/or (b) the reagent anions or negatively charged ions are derived from the group consisting of: (i) anthracene; (ii) 9,10 diphenyl-anthracene; (iii) naphthalene; (iv) fluorine; (v) phenanthrene; (vi) pyrene; (vii) fluoranthene; (viii) chrysene; (ix) triphenylene; (x) perylene; (xi) acridine; (xii) 2,2' dipyridyl; (xiii) 2,2' biquinoline; (xiv) 9-anthracenecarbonitrile; (xv) dibenzothiophene; (xvi) 1,10'-phenanthroline; (xvii) 9' anthracenecarbonitrile; and (xviii) anthraquinone; and/or (c) the reagent ions or negatively charged ions comprise azobenzene anions or azobenzene radical anions.

According to an embodiment the process of Electron Transfer Dissociation fragmentation comprises interacting analyte ions with reagent ions, wherein the reagent ions comprise dicyanobenzene, 4-nitrotoluene or azulene.

BRIEF DESCRIPTION OF THE DRAWINGS

Various embodiments will now be described, by way of example only, and with reference to the accompanying drawings in which.

DETAILED DESCRIPTION

Figure 1:
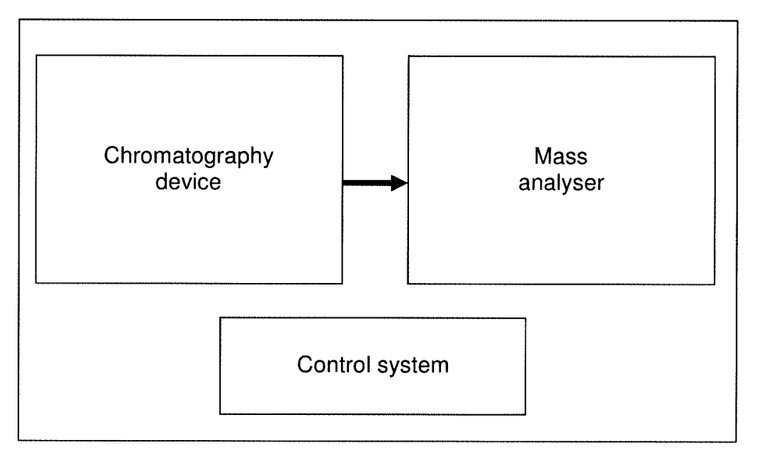
FIG. 1 shows illustrates an embodiment wherein a chromatography device is coupled to a mass analyser and wherein a control system is provided.

FIG. 1 shows illustrates an embodiment wherein a chromatography device is coupled to a mass analyser and wherein a control system is provided.

In various embodiments, liquid chromatography-MS and liquid chromatography-MS/MS acquisition techniques are used to acquire one or more parent (precursor) ion data sets (spectra) and one or more corresponding product ion data sets (spectra) for a sample eluting from an liquid chromatography device. Product ion data sets can be obtained by post-acquisition binning or by MS/MS acquisition using Data Dependent Acquisition ("DDA").

In various embodiments, eluent from a liquid chromatography device is passed into an ion source where it is ionised. A fragmentation, collision or reaction device may be arranged downstream of the ion source and is in an embodiment configured to selectively fragment or react parent ions to produce product ions. A Time of Flight ("ToF") mass spectrometer may be arranged downstream of the fragmentation, collision or reaction device and is in an embodiment used to acquire the parent and product ion data sets.

In one embodiment, the fragmentation, collision or reaction device is switched repeatedly between a first (high energy) mode of operation in which parent ions are substantially fragmented or reacted to produce product ions, and a second (low energy) mode of operation in which parent ions are not substantially fragmented or reacted, or are fragmented or reacted to a lesser degree, or are arranged to bypass the fragmentation, collision or reaction device.

In one embodiment, the fragmentation, collision or reaction device is switched between the first and second modes of operation with a 50% duty cycle, in an embodiment by altering a voltage applied to the fragmentation, collision or reaction device and/or an upstream electrode. In this embodiment, the acquired data sets alternate between parent ion data sets and product ion data sets. In an embodiment, the duty cycle is set to be high enough so that a chromatographic peak is sampled in both the first and second modes of operation.

In an embodiment, after acquisition, product ions and parent ions are detected, and the product ions are "binned" to particular parent ions, so as to produce one or more product ion data sets for the one or more particular parent ions. In one embodiment, binning is accomplished by retention time alignment.

In one embodiment, a product ion is binned to a particular parent ion if the product ion's retention time is the same as the particular parent ion to within measurement error. Measurement error may be taken to be a fraction of the parent ion's peak width, such as ±the half-width at half maximum of the parent ion's chromatographic peak width.

To achieve this, in an embodiment, the raw data is analysed to detect ions resulting from the first and second modes of operation in order to measure their properties, and to produce ion lists. In an embodiment, the ion lists may be processed by firstly clustering ions relating to the same parent ion together to form charge clusters and accurate mass-retention times, and secondly by producing the product ion data sets for each parent ion using retention time alignment.

As is known in the art, product ions (precursor ions) will often appear in a mass spectra (data seta) along with a series of related isotopic ions. The isotopic ions can have one or more particular charge states. An isotopic series at a given charge state is referred to herein as a "charge cluster". All of the related ions are referred to herein as an accurate mass-retention time ("AMRT"). The methods can be applied to all ions related to a product (precursor) regardless of how they are labelled or grouped. Thus, it will be understood that the word "ions" as used herein, applies to ions, charge clusters and accurate mass-retention times.

As discussed above, in these "alternate scanning" methods, product ions relating to all of the parent ions present in the source will be present in the corresponding product ion data set. If two components co-elute from the liquid chromatography device so that their chromatographic peaks overlap, but their retention times can be distinguished, product ions can be reliably assigned to the appropriate component. However, in complex samples it is not uncommon for components to co-elute so that the retention times of their parent and product ions are close enough that they cannot be distinguished. As a result, a product ion may be initially assigned to (binned to) more than one particular parent ion (or particular set of parent ions).

In one embodiment, an ion mobility separation ("IMS") device is arranged downstream of the ion source and upstream from the fragmentation, collision or reaction device. In this embodiment, binning may be accomplished by retention time and ion mobility alignment. In one embodiment, a product ion is binned to a particular parent ion if the product ion's retention time and/or ion mobility are same as the particular parent ion to within measurement error. Measurement error in ion mobility may be taken to be ±the half-width at half maximum of the parent ion's mobility peak width. As discussed above, there are a significant number of cases where two components have retention times and ion mobility drift times that cannot be distinguished. Thus, embodiments using ion mobility alignment can reduce, but not eliminate the consequences of co-elution.

In another embodiment, "SWATH" acquisition may be used to acquire one or more parent (precursor) ion data sets (spectra) and one or more corresponding product ion data sets (spectra) for a sample eluting from an liquid chromatography device. In this embodiment, a transmission window of, for example, 25 Da may be sequentially incremented in steps of approximately 25 Da. In this embodiment, product ions related to (derived from) all of the parents ions transmitted by the transmission window will be present in each of the product ion data sets.

In another embodiment DDA may be used to acquire one or more parent (precursor) ion data sets (spectra) and one or more corresponding product ion data sets (spectra) for a sample eluting from an liquid chromatography device. In an embodiment, parent ion data sets (spectra) are acquired and monitored over a relatively large mass to charge ratio range.

In one embodiment, when a parent ion of interest is detected (e.g. that meets a trigger criterion), a transmission window (e.g. of a quadrupole mass filter) may be adjusted so that only parent ions within a relatively small mass to charge ratio range centered on the parent ion of interest are passed to the fragmentation, collision or reaction device. Simultaneously, the fragmentation, collision or reaction device may be switched to a mode of operation in which parent ions are fragmented or reacted to produce product ions (e.g. by raising a voltage in the fragmentation, collision or reaction device), and one or more product ion data sets (spectra) may be acquired.

The product ion data sets acquired in this manner contain product ions relating to (derived from) all of the parent ions within the transmission window. Thus, product ion data sets nominally assigned to (and triggered by) one or more particular parent ions, can contain product ions relating to (derived from) other parent ions. For example, if two components co-elute so that their chromatographic peaks overlap in time, and have parent ions with mass to charge ratios within the transmission window, then the product ion data set can contain product ions from both components.

As will be appreciated, if a particular molecular component is separated by an liquid chromatography device such that it does not co-elute with any other component, then its parent ions can, in general, be readily distinguished and its product ions can be correctly assigned to the parent ions. However, when separating a complex sample using an liquid chromatography system, it is common for components to co-elute i.e. for a second chromatographic peak to arise before a first chromatographic peak subsides.

Co-elution affects the various acquisition techniques in different manners as discussed above. However, regardless of the acquisition technique used, if two components co-elute from the liquid chromatography device, product ions relating to (derived from) a particular parent ion may appear in a product ion data set (spectrum) for another parent ion. In other words, a product ion data set relating to one or more particular parent ions may contain product ions relating to (produced from) other parent ions.

In embodiments product ions present in product ion data sets as a result of co-elution may be removed. In an embodiment, when a product ion is identified as relating to (being derived from) one or more particular parent ions, that product ion is removed from product ion data sets relating to other parent ions. Thus, embodiments can be used to address the consequences of co-elution that is unavoidable for complex samples.

For convenience, the term Relative Defect Intensity Filter ("RDIF") is applied to embodiments described herein, whose goal is to remove product ions not associated with a particular parent ion from the parent ion's product ion data set.

The techniques of various embodiments may be applied to the product ion data sets after acquisition but before they are submitted to a search engine. The techniques may make use of generic properties of the parent ions and do not require knowledge of the specific composition of the particular parent ions.

The methods of various embodiments can be applied to any type of sample, including, for example, small molecules, met ID and toxicology samples, lipids and peptides. Various embodiments apply to all manner of mass spectrometry techniques.

The methods of various embodiments can be applied to data from both positive and negative ionization.

The methods of various embodiments can be applied directly to the one or more data sets, or can be applied to data sets that have been de-isotoped.

In an embodiment, the one or more parent (precursor) ion data sets (spectra) and the one or more corresponding product ion data sets (spectra) are processed (analysed) in order to make a determination as to which product ions in the one or more product ion data sets must be related to (associated with) (or are highly likely to be related to) one or more particular, selected parent ions. Ions identified in this manner are termed "anchor ions".

In an embodiment, this is done by examining the masses or mass to charge ratios and intensities of ions in product ion data sets (in an embodiment by processing the product ion data set (spectrum) assigned to a parent ion by one or more of the processes described below), and in an embodiment determining whether a product ion falls into one of several categories (as described further below). The determination may use knowledge of the sample type and of the mass or masses to charge ratios and intensities of the one or more parent ions.

Thus, an "anchor ion" is a product ion (or charge cluster or accurate mass-retention time) which, based on its mass or mass to charge ratio and intensity, and on the mass or mass to charge ratio, intensity, and physical or chemical properties of the corresponding one or more parent ions (and/or sample), can be assigned with a high level of confidence to one or more particular parent ions.

In an embodiment, three kinds of anchor ions are defined and used: "strong" anchor ions, "weak" anchor ions, and "virtual" anchor ions. Strong anchor ions are product ions that are definitely related to (derived from) a particular parent ion, and cannot be related to (derived from) any other parent ion. Weak anchor ions are product ions that are likely to be related to a particular parent ion, but could be related to another parent ion. They are not limited to a particular parent ion's product ion data set. Virtual anchor ions are product ions that do not appear in the product ion data set, but which can nevertheless be considered and used as anchor ions.

Once anchor ions have been identified, they can be used in a variety of ways. In an embodiment, anchor ions may be used to simplify data sets (spectra), or sets of data sets (sets of spectra). In an embodiment, anchor ions are deleted from the other product ion data sets that they appear in. In another embodiment, product ions in a product ion data set that have mass or mass to charge ratio values that cannot be related to (derived from) the corresponding one or more parent ions are removed from the product ion data set.

In various embodiments, several categories of anchor ions are defined and identified, including the following categories. Other categories of anchor ions are also contemplated. Many of the examples for the following categories are given in terms of peptides. However, it will be appreciated that the techniques described are equally applicable to other types of ions.

In an embodiment, the unfragmented parent ion mass (or mass to charge ratio) is defined and used as an anchor ion. This is the parent ion mass appearing in elevated energy. Ideally, all parent ions would fragment to product ions. However, a parent ion that does not fragment will appear in the product ion data set (spectrum) at reduced intensity. In peptides this corresponds to YMax. In an embodiment, this is defined and used as a strong anchor.

In an embodiment, the one or more product ion data sets are analysed to identify, for each parent ion, the associated unfragmented mass in the one or more product ions data sets. In an embodiment, the retention time and drift time of the unfragmented ion can be used in the identification, as these will be identical to (within measurement error) the parent ion. These anchor ions do not contribute to the identification of the parent ion, but may be removed from other product ion data sets (spectra).

In an embodiment, neutral loss ions are defined and used as anchor ions. A neutral loss ion is formed when the parent ion loses a well known chemical subunit. As such, neutral loss ions will appear in the product ion data sets at a mass or mass to charge ratio corresponding to the mass or mass to charge ratio of the parent ion minus the mass or mass to charge ratio of the chemical subunit. For example, in the case of peptides a common neutral loss ion results from the loss of $H_2O$ (corresponding to BMax). In an embodiment, this is defined and used as a strong anchor.

In an embodiment, complementary product pairs are defined and used as anchor ions. Complementary product pairs are a pair of product ions whose masses or mass to charge ratios sum to the mass of mass to charge ratio of the parent ion plus a charged adduct. For example, in the case of peptides, the b/y pair which occur as the result of fragmentation or reaction is a complementary product pair. In an embodiment, complementary product pairs are defined and used as strong anchor ions.

In an embodiment, in the case of peptides, only a proton (H*) is considered as the adduct. However, the methods of various embodiments are not limited to any particular charged adduct.

In an embodiment, the one or more product ion data sets are analysed to find all pairs of ions whose masses or mass to charge ratios add up to the mass or mass to charge ratio of the parent ion (in an embodiment to within the measurement error) (optionally plus the mass or mass to charge ratio of a charged adduct). Thus, a complimentary product pair $m_1$ and $m_2$ is identified if a pair of ions satisfy:

$$m+a=m_1+m_2 \quad (1)$$

wherein m is the parent ion mass or mass to charge ratio, $m_1$ and $m_2$ are product ion masses or mass to charge ratios, and a is the mass of an adduct, included to conserve charge and mass.

In the case of peptides, this requirement can be written:

$$m_p+H^+32\ y_n+b_m \quad (2)$$

wherein n+m is the total number of amino acids present in the parent ion of mass $m_p$.

Taking into account measurement error, the requirement can be written as:

$$|(m+a)-(m_1+m_2)|<\varepsilon \quad (3)$$

i.e. the absolute value of the difference between the sum of the masses or mass to charge ratios of the parent ion and a charged adduct and the sum of the masses or mass to charge ratios of the complimentary product pairs must be less than the measurement error $\varepsilon$.

In an embodiment, intensity filter rules are applied as appropriate (as discussed further below) to eliminate potential sources of false positives. In an embodiment, each of the identified complimentary product pairs are tagged as anchor ions. In an embodiment, these ions are maintained in the appropriate product ion data set, but are removed from other product ion data sets.

It should be noted that advantageously, neither specific knowledge of the chemical composition of the sample, nor of the fragmentation site, is required to identify complimentary product pairs. The identification simply makes use of the fact that certain ions, such as peptides, fragment into complimentary pairs of product ions.

In an embodiment, extended complementary product pairs are defined and used as anchor ions. An extended complementary product pair is a pair of product ions whose masses or mass to charge ratios sum to the mass or mass to charge ratio of the parent ion plus a charged adduct plus a delta mass value. In an embodiment, extended complementary product pairs are defined and used as strong anchor ions.

For example, in the case of peptides, product ions may be produced by two fragmentation events that occur at fragmentation sites separated by one or two amino acids. In these cases, the delta mass value considered and used is plus (or minus) masses corresponding to a monomer or dimer peptide (e.g. one of twenty amino acids or one of 400 dimers).

In the case of a monomer delta mass, product ions are produced by two fragmentation events that occur at fragmentation sites separated by one amino acid mass, and:

$$m_p+H^+=y_n+b_m \quad (4)$$

$$m_p+H^+=y_{n+1}+b_{m-1} \quad (5)$$

Thus, $y_n$ and $b_{m-1}$ are one possible extended complementary pair, and $y_{n+1}$ and $b_m$ are another.

$$m_p+H^+=y_n+b_{m-1}+a_1 \quad (6)$$

$$m_p+H^+=y_{n+1}+b_m-a_1 \quad (7)$$

wherein $a_1$ is the mass of one of the 20 naturally occurring amino acids.

In an embodiment, each of the identified extended complimentary product pairs are defined and used as anchor ions. In an embodiment, these ions are maintained in the appropriate product ion data set, but are removed from other product ion data sets. It should be noted that extended complementary product pairs require knowledge of allowed delta masses.

In an embodiment, charge replicates are defined and used as anchor ions.

In embodiments in which ion mobility ("IMS") is used, the ion mobility cell separates parent ions having different charge states i.e. if a component is ionised into two or more parent ions having different charge states, then each charge state will appear at a distinct value of ion mobility drift. In general, the different charge states will produce different, but related, product ion data sets (spectra). Since product ions appear at ion mobility drift times identical to the associated parent ion, the respective product ions will also appear at distinct values of ion mobility drift. Thus, using ion mobility drift time alignment, a product ion data set (spectrum) can be associated with the corresponding charge state of a parent ion.

If a product ion appears in two or more such data sets, it is highly likely that the ions were derived from a common component. Thus, in an embodiment, product ions common to two charge states are defined and used as anchor ions.

In an embodiment, the product ion data sets are examined to identify product ions having the same mass or mass to charge ratio appearing at different ion mobility drift times, and to determine whether these ions are ion mobility drift-aligned to two charge states of the same parent ion. In an embodiment, such charge replicates are defined and used as weak anchor ions (because they may be shared with other parent ions which also exhibit charge replicates).

In an embodiment, pairs of ions are labelled as anchor ions if they have the same retention time, have the same mass or mass to charge ratio, align with parent ions at two different charge states, have the same or less charge than the parent ion to which they align, and optionally meet intensity criteria.

In an embodiment, in-source replicate ions are defined and used as anchor ions. In-source product ions are produced when parent ions fragment before reaching the fragmentation, collision or reaction device. Often, the same product ions are produced by in-source fragmentation as are produced by fragmentation in the fragmentation, collision or reaction device. Thus, in-source fragmentation is characterised by the appearance of the same product ions in a parent ion data set and a related product ion data set, having the same retention time. In an embodiment, in-source replicate ions are defined and used as strong anchor ions.

In an embodiment, the one or more data sets are examined to identify ions having the same retention time and mass or mass to charge ratio that appear in a parent ion data set and a corresponding product ion data set.

In-source product ions in a parent ion data set have the same retention time as the one or more parent ions, but in general have different values of ion mobility. In embodiments using ion mobility separation, the ion mobility drift offset between the in-source product ions and the parent ions in a parent ion data set is used to confirm the identity of in-source product ions. In an embodiment, the offset in ion mobility drift between the parent ion and its in-source product ions is estimated, for example, using a model of peptide cross-sections.

Once an in-source product ion is identified, a number of steps can be taken. For example, the intensity of the in-source product ions can be added to the intensity of the associated parent ions and/or product ions. Additionally or alternatively, the identified in-source product ions can be removed from consideration as possible parent ions.

In addition, in the case of y-type in-source product ions, y-type product ions will drift align with the in-source product ions, and have the same masses or mass to charge ratios that will be observed in y-type product ions of the original parent ion. If these replicates are observed, they can be identified and used as anchor ions.

In an embodiment, virtual anchor ions are defined and used as anchor ions. Virtual anchor ions are ions that do not appear in the one or more data sets, but which can nevertheless be defined and used as anchor ions. For example, as discussed above, peptide product ions are produced in b/y pairs. Thus, if only one of the pairs is present, and it can be determined that the ion is an anchor ion, then the missing product ion may be treated as a virtual anchor ion.

Similarly, if the unfragmented parent ion is not present in the product ion data set, it may be treated as a virtual anchor ion. For peptides, an ion corresponding to the mass or mass to charge ratio of the unfragmented parent ion minus mass of $H_2O$ may also be treated a virtual anchor ion (corresponding to BMax). In general, ions having a mass or mass to charge ratio differing from the mass or mass to charge ratio of a parent ion by a certain delta mass (depending on the sample type) may be treated as virtual anchor ions.

In an embodiment, once anchor ions have been identified, a sequence extension technique is used to identify additional anchor ions and/or additional information.

If a component has a pair of fragmentation sites that straddle a mass subunit, then product ion data sets (spectra) often contain two product ions that differ in mass or mass to charge ratio by the mass or mass to charge ratio of that subunit. Thus, in an embodiment, the one or more data sets are examined to find a pair of ions in a product ion data set having a mass or mass to charge ratio difference corresponding to an expected subunit.

If such a pair of ions is found, they may be determined to belong to the same product ion data set. If one of the ions is an anchor ion to a parent ion, then the other product ion may also be identified as an anchor ion.

In an embodiment, for each already-identified anchor ion in a product ion data set, a search is made for other product ions in the product ion data set that differ in mass or mass to charge ratio by an amount corresponding to a commonly occurring subunit. In an embodiment, such ions are then defined and used as anchor ions. This procedure may be repeated until no more new anchor ions can be found.

For example, in the case of peptides, a search for short sequence extensions may be implemented that starts with an anchor ion and terminates when no further new anchor ions (extensions) are found. Starting with an anchor ion, a search may be made for ions having masses or mass to charge ratios that differ by the mass or mass to charge ratio of an amino acid. If the anchor ion is the unfragmented parent ion, the search may be made for lower mass or mass to charge ratio ions. If the anchor ion is a complement ion or another anchor ion (not a parent ion), the search may be made for ions having masses or mass to charge ratios that are higher or lower by an amount corresponding to one amino acid.

If such an ion is found, it may be identified and used as an anchor ion, and the search may then be repeated. If such an ion is not found, a search may be made for mass or mass to charge ratio differences that correspond to one of 400 possible pairs of amino acids. If such an ion is found, it may be identified and used as an anchor ion. In an embodiment, the search is then resumed, starting from one amino acid mass or mass to charge ratio difference. In an embodiment, the search is extended to cover all possibilities up to a maximum delta mass.

In an embodiment, anchor ions are maintained in the appropriate product ion data set, but are removed from other product ion data sets.

In an embodiment, knowledge of the mass or mass to charge ratio of fragmentation subunits can be used to remove ions from product ion data sets. In one such embodiment, ions near each anchor ion in the product ion data set are removed if the mass or mass to charge ratio of the ions is not equal to the mass or mass to charge ratio of the anchor ion plus or minus the mass or mass to charge ratio of a subunit.

For example, for certain sample types, the possible fragmentation sites for components are known. Moreover, these fragmentation sites are generally associated with chemical subunits that make up the components. For example, peptides are made up of sequences of amino acids, and they fragment at the peptide-bond. Fragments of peptides are themselves peptides, i.e. sequences of amino acids. It follows that the mass or mass to charge ratio difference between peptide product ions relating to a common parent ion must be the mass or mass to charge ratio of a (shorter) peptide sequence.

Thus, for certain sample types, such as peptides, ions can only take on certain masses (mass to charge ratios) and can only be separated by mass (mass to charge ratio) differences of certain (ranges of) values, while other values are excluded, leading to mass or mass to charge ratio deficient regions. Advantageously, the mass or mass to charge ratio differences do not depend on the particular parent ion in question.

In one embodiment, a list of the masses or mass to charge ratios of possible product ions relating to a parent ion is constructed. This may be done by compiling a list of known delta masses of product ions for the sample type in question. For example, for peptide mixtures, the delta masses will correspond to the masses of the 20 essential amino acids, and the masses of dimer and trimer peptides. The list may be constructed by specifying all possible mass or mass to charge ratio differences up to a limit (such as, e.g., 1,000 Da).

In an embodiment, the delta masses are modified by a fixed modification in view of the sample preparation. As an example, cysteine is typically modified in peptide preparation and changed to carbamidomethyl cysteine. To accommodate this, the mass of cysteine 103.0092 may be replaced with 160.0307.

In an embodiment, delta masses corresponding to variable modifications are included. An example of a variable modification is the commonly occurring oxidation of methionine. In this case both the unmodified mass, 131.0405 and the modified mass 147.0354 may both be entered into the list of delta masses.

In an embodiment, when searching for glycol-peptides the masses of the monosaccharaides can be added to the delta masses list.

In an embodiment, a window, or "delta-mass range", centered on each of the possible masses or mass to charge ratios is defined. The delta-mass range is a mass or mass to charge ratio range in which the mass or mass to charge ratio of a product ion from a common component to an anchor ion can fall. In an embodiment, delta-mass ranges take into account instrument resolution. For example, a single amino acid will have a delta-mass range centered on the exact mass or mass to charge ratio value with a width of, e.g. ±FWHM/2.

Thus, in an embodiment, a list of delta-mass ranges is created by listing all possible exact delta mass values, adding a resolution range centered on each value, and then combining overlapping ranges. This list may be conveniently referred to as a "OneMass" filter.

In an embodiment, a "TwoMass" filter may be created that lists all possible masses or mass to charge ratios that can result from a combination of two delta masses.

In an embodiment, higher order combinations of delta masses may be used, in an embodiment up to a maximum number. The combination of N delta masses, k times gives $N!/(k!*(N-k)!)+N$ masses.

In an embodiment, the multiple lists created by the "OneMass", "TwoMass", and further filters are combined to create a "Relative Mass Deficiency filter". This can be used to determine masses or mass to charge ratios at which product ions cannot exist, by applying the filter to each anchor ion. For peptides, there are few possible values at low delta mass values. At higher delta mass values, there are typically mass deficient and mass efficient regions.

In an embodiment, for an anchor ion, the "OneMass" filter is firstly used to find any product ion having a mass or mass to charge ratio that is separated from the mass or mass to charge ratio of the anchor ion by one delta mass. In an embodiment, any such product ion is identified as a new anchor ion, and optionally, if its complement is found it is also identified as a new anchor ion. In an embodiment, if the complement ion is not found, the expected mass or mass to charge ratio of the complement ion is identified and used as a new virtual anchor ion.

In an embodiment, the delta masses may be added to the mass or mass to charge ratio of an anchor as long as the resulting mass or mass to charge ratio is less than the mass or mass to charge ratio of the parent ion. In an embodiment, the delta masses may be subtracted from the mass or mass to charge ratio of an anchor as long as the resulting mass is positive.

In an embodiment, if no product ions are identified using the "OneMass" filter, then the "TwoMass" filter may then be applied in a corresponding manner. In an embodiment, a parameter is used to control the number of higher order filters used to attempt to find new anchor ions.

In one embodiment, the filters can be used to attempt to identify new anchor ions up to a maximum mass or mass to charge ratio value from the anchor ion in question. In an embodiment, the maximum value may correspond to another (already-identified) anchor ion. Therefore, if the mass or mass to charge ratio difference between the closest anchor ion and the anchor ion in question is m, in an embodiment, only delta masses <m are considered. However, this need not be the case as it is possible to have delta masses jump across other anchor ions since, for example, in the case of peptides there are two chains (y chain, and b chain).

In an embodiment, the above steps are repeated with all identified anchor ions and in an embodiment with all newly identified anchor ions.

Once anchor ions have been identified, and in an embodiment once no new anchor ions can be identified, the Relative Mass Deficiency filter may be applied to filter product ions. Ions that fall outside all of the windows cannot be related to the anchor ions and hence may be removed from the product ion data set.

In an embodiment, if a product ion data set contains more than a predefined number of anchor ions, only the anchor ions are output.

In an embodiment, an intensity filter may be applied to remove ions having an intensity more than or less than a predefined ratio of the parent ion intensity. For example, this may be done if a product ion data set comprises less than the predefined number of anchor ions.

In various embodiments, the methods may include: (i) performing a database search using only those parent ion data sets and/or product ion data sets that contain at least one complement pair (e.g., a b/y pair in the case of peptides); (ii) performing a database search using only those parent ion data sets and/or product ion data sets that contain no anchor ions; (iii) for a given product ion data set, if there are a predefined number (e.g. three) or more anchor ions in the product ion data set, retaining only the anchor ions in the data set, and removing other ions in that product ion data set; and (iv) if anchor ions are tied to one parent ion's product ion data set, then excluding those ions from product ion data set associated with other parent ions.

The methods of various embodiments may be incorporated into existing analysis techniques. One known analysis technique performs two logically distinct operations. The first operation is to group ions into charge clusters and accurate mass-retention times. In the second operation, the "binned" spectra are produced, associating product accurate mass-retention times to precursor accurate mass-retention times. In an embodiment, the methods described herein are incorporated into the binning operations.

As an example, the parameters for the analysis technique may be: (i) the list of delta masses, optionally any neutral losses associated with those delta masses; (ii) the delta mass of the b chain; (iii) adducts to use for finding complement masses; (iv) a maximum number of combined delta masses to use to find new anchors; (v) maximum mass for the Relative Mass Deficiency filter; and (vi) the "MinAnchorOnly" count (i.e. if there at least this many anchor ions only the anchor ions are output).

The data may be output in a format suitable for use in search engines.

Although the present invention has been described with reference to preferred embodiments, it will be understood by those skilled in the art that various changes in form and detail may be made without departing from the scope of the invention as set forth in the accompanying claims.

The invention claimed is:

1. A method of mass spectrometry comprising:
ionising an eluent from a chromatography device to produce parent ions;
mass analysing at least some of the parent ions;
fragmenting or reacting at least some of the parent ions to produce product ions, and mass analysing the product ions;
assigning product ions to parent ions so as to obtain a plurality of product ion data sets, wherein each product ion data set of the plurality of product ion data sets is assigned to one or more parent ions such that a first product ion data set of the plurality of product ion data sets is assigned to one or more first parent ions, and a second product ion data set of the plurality of product ion data sets is assigned to one or more second different parent ions, wherein the first and second parent ions are co-eluting parent ions; and then
removing, from said second product ion data set, one or more product ions that are unrelated to the said one or more second parent ions by:
determining whether one or more product ions are present in the first product ion data set that are related to the one or more first parent ions based on the mass to charge ratios or on the mass to charge ratios and intensities of one or more product ions in the first product ion data set and based on the mass to charge ratios or on the mass to charge ratios and intensities of said one or more first parent ions;
and if it is determined that one or more product ions that are related to the one or more first parent ions are present in the first product ion data set, removing said one or more product ions from said one or more second product ion data sets to produce one or more second modified product ion data sets.

2. A method as claimed in claim 1, further comprising removing ions that are unrelated to the one or more first parent ions from said first product ion data set to produce a first modified product ion data set.

3. A method of mass spectrometry comprising:
ionising an eluent from a chromatography device to produce parent ions;
mass analysing at least some of the parent ions;
fragmenting or reacting at least some of the parent ions to produce product ions, and mass analysing the product ions;
assigning product ions to parent ions so as to obtain one or more product ion data sets, wherein each product ion data of the one or more of product ion data sets is assigned to one or more parent ions such that a first product ion data set of the plurality of product ion data sets is assigned to one or more first parent ions; and then
removing, from said first product ion data set, one or more product ions that are unrelated to said one or more first parent ions but which are present in the first product ion data set due to co-eluting parent ions, by:
determining whether one or more product ions are present in the first product ion data set that cannot be related to the one or more first parent ions based on the mass to charge ratios or on the mass to charge ratios and intensities of one or more product ions in the first product ion data set and based on the mass to charge ratios or on the mass to charge ratios and intensities of said one or more first parent ions; and
if it is determined that one or more product ions that cannot be related to the one or more first parent ions are present in the first product ion data set, removing the ions that cannot be related to the one or more first parent ions from said first product ion data set to produce a first modified product ion data set.

4. A method as claimed in claim 1, further comprising:
separating said parent ions according to their ion mobility; and
assigning product ions to parent ions using ion mobility drift alignment.

5. A method as claimed in claim 1, further comprising assigning product ions to parent ions using retention time alignment.

6. A method as claimed in claim 1, further comprising assigning product ions to parent ions using Data Dependent Acquisition.

7. A method as claimed in claim 1, wherein:
said one or more second product ion data sets comprise one or more product ion data sets acquired at the same time, immediately before or immediately after said first product ion data set; and/or
one or more second parent ion data sets comprise parent ion data sets acquired at the same time, immediately before or immediately after said first parent ion data set.

8. A method as claimed in claim 1, wherein the step of determining whether, in said first product ion data set, one or more product ions are present that are related to the one or more first parent ions comprises determining whether, in said first product ion data set, one or more ions are present that must be related to or that are likely to be related to said one or more first parent ions.

9. A method as claimed in claim 1, wherein the step of determining whether, in said first product ion data set, one or more product ions are present that are related to the one or more first parent ions comprises determining whether one or more anchor ions are present in said corresponding the first product ion data set.

10. A method as claimed in claim 1, wherein the step of determining whether, in said first product ion data set, one or more product ions are present that are related to the one or more first parent ions comprises determining whether: (i) one or more unfragmented parent ions; (ii) one or more neutral loss ions; (iii) one or more complementary product ion pairs; (iv) one or more extended complementary product ion pairs; (v) one or more charge replicates; and/or (vi) one or more in-source replicate ions; are present in said first product ion data set.

11. A method as claimed in claim 1, further comprising determining whether, in said first product ion data set, one or more additional product ions are present that are related to said one or more first parent ions by identifying ions in said first product ion data set that have a mass or mass to charge ratio value differing from the mass or mass to charge ratio value of said one or more first product ions by an amount equal to the mass or mass to charge ratio of one or more known fragmentation subunits.

12. A method as claimed in claim 1, further comprising identifying one or more virtual anchor ions for said first product ion data set.

13. A method as claimed in claim 1, further comprising:
determining whether, in said first product ion data set, one or more ions are present that have an intensity greater than or less than a portion of the intensity of said one or more first parent ions; and
if it is determined that said one or more ions are present, removing said one or more ions from said first product ion data set to produce a first modified product ion data set.

14. A method as claimed in claim 1, further comprising:
submitting said one or more data sets to a search engine to determine the composition of said eluent.

15. A mass spectrometer comprising:
a chromatography device;
an ion source configured to ionise an eluent from the chromatography device to produce ions;
a fragmentation, collision or reaction device;
a mass analyser; and
a control system arranged and adapted:
(i) to cause said mass spectrometer to ionise an eluent from said chromatography device to produce parent ions, to mass analyse at least some of the parent ions, to fragment or react at least some of the parent ions to produce product ions, and to mass analyse the product ions;

(ii) to assign product ions to parent ions so as to obtain a plurality of product ion data sets, wherein each product ion data set of the plurality of product ion data sets is assigned to one or more parent ions such that a first product ion data set of the plurality of product ion data sets is assigned to one or more first parent ions, and a second product ion data set of the plurality of product ion data sets is assigned to one or more second different parent ions, wherein the first and second parent ions are co-eluting parent ions; and then (iii) to remove, from said second product ion data set, one or more product ions that are unrelated to the said one or more second parent ions by:
determining whether one or more product ions are present in the first product ion data set that are related to the one or more first parent ions based on the mass to charge ratios or on the mass to charge ratios and intensities of one or more product ions in the first product ion data set and based on the mass to charge ratios or on the mass to charge ratios and intensities of said one or more first parent ions; and
if it is determined that one or more product ions that are related to the one or more first parent ions are present in the first product ion data set, removing said one or more product ions from said one or more second product ion data sets of said plurality of product ion data sets to produce one or more second modified product ion data sets.

16. The method as claimed in claim 1, wherein the step of determining whether, in said first product ion data set, one or more product ions are present that are related to the one or more first parent ions comprises comparing the mass to charge ratios or the mass to charge ratios and intensities of ions in said first product ion data set to the mass to charge ratios or the mass to charge ratios and intensities of the one or more first parent ions.

17. The method as claimed in claim 3, wherein the step of determining whether, in said first product ion data set, one or more product ions are present that are related to the one or more first parent ions comprises comparing the mass to charge ratios or the mass to charge ratios and intensities of ions in said first product ion data set to the mass to charge ratios or the mass to charge ratios and intensities of the one or more first parent ions.

18. The mass spectrometer as claimed in claim 15, wherein the control system in arranged and adapted to determine whether, in said first product ion data set, one or more product ions are present that are related to the one or more first parent ions by comparing the mass to charge ratios or the mass to charge ratios and intensities of ions in said first product ion data set to the mass to charge ratios or the mass to charge ratios and intensities of the one or more first parent ions.

* * * * *